United States Patent [19]
Ureshino et al.

[11] Patent Number: 5,776,507
[45] Date of Patent: Jul. 7, 1998

[54] CENTER MECHANISM FOR TIRE VULCANIZER

[75] Inventors: Kashiro Ureshino; Hiroyuki Takebayashi; Hisaaki Onishi; Hisashi Mitamura, all of Takasago, Japan

[73] Assignee: Kabushiki Kaisha Kobe Seiko Sho, Kobe, Japan

[21] Appl. No.: 648,757

[22] Filed: May 16, 1996

[30] Foreign Application Priority Data

Jun. 2, 1995 [JP] Japan ............................ 7-159800

[51] Int. Cl.$^6$ .................................................. B29C 33/02
[52] U.S. Cl. ......................... 425/29; 425/48; 425/52
[58] Field of Search ......................... 425/28.1, 29, 30, 425/43, 48, 52

[56] References Cited

U.S. PATENT DOCUMENTS

| | | | |
|---|---|---|---|
| 1,418,635 | 6/1922 | Finn | 425/28.1 |
| 4,359,675 | 11/1982 | Miller, III | 425/29 |
| 4,368,015 | 1/1983 | Kawahara et al. | 425/29 |
| 4,695,235 | 9/1987 | Ichikawa et al. | 425/29 |
| 5,015,165 | 5/1991 | Ozaki et al. | 425/28.1 |
| 5,221,500 | 6/1993 | Gent et al. | 425/29 |
| 5,223,273 | 6/1993 | Irie et al. | 425/29 |
| 5,314,648 | 5/1994 | Ichikawa et al. | 425/29 |

FOREIGN PATENT DOCUMENTS

| | | | |
|---|---|---|---|
| 368546 | 5/1990 | European Pat. Off. | 425/28.1 |

*Primary Examiner*—James P. Mackey
*Attorney, Agent, or Firm*—Oblon, Spivak, McClelland, Maier & Neustadt, P.C.

[57] ABSTRACT

A center mechanism for a tire vulcanizer having a first cylinder whose stroke can be detected with a simplified structure achieves reduction in cost and improvement in working efficiency upon maintenance. The center mechanism expands, while the first cylinder 1 moves downwardly, a bladder 5 into close contact with an inner face of a green tire. A downward stop position of the first cylinder 1 is set in advance by a linear sensor 14. The stroke amount of the first cylinder 1 is detected by a stroke bracket 12 having a stroke portion 12a extending downwardly in parallel to the first cylinder 1 from within a stem 8 and provided so as to advance into the stem 8 together with a cylinder rod 1a, and a linear sensor 14 for detecting the stroke amount of the first cylinder 1 from the stroke portion 12a of the stroke bracket 12 remaining outside the stem 8.

4 Claims, 5 Drawing Sheets

CENTER MECHANISM FOR TIRE VULCANIZER

BACKGROUND OF THE INVENTION

This invention relates to a center mechanism for a tire vulcanizer wherein a bladder is expanded into close contact with an inner face of a green tire.

Generally, a green tire is loaded into a cavity formed upon closing of an upper mold and a lower mold, and a bladder is expanded into close contact with an inner face of the green tire to perform shaping of the green tire. In recent years, a center mechanism of the type which automatically sets a shaping stroke is used in order to achieve labor saving.

In particular, for example, ① Japanese Utility Model Laid-Open No. Sho 63-163915 discloses a center mechanism which includes, as shown in FIG. 4, a first cylinder 54 for moving an upper clamp mechanism 52 upwardly and downwardly, a second cylinder 55 arranged in series below the first cylinder 54, and a pair of guide rods 56 arranged sidewardly of the first cylinder 54 for upward and downward movement together with the first cylinder 54. The center mechanism performs shaping of a green tire while the position of the upper clamp mechanism 52 is detected by a positioner 58 provided on the first cylinder 54 between the guide rods 56.

Meanwhile, for example, ② Japanese Patent Laid-Open No. Hei 5-162140 discloses another center mechanism which includes, as shown in FIG. 5, a first cylinder 54 for moving an upper clamp mechanism 52 upwardly and downwardly, a stem 57 having a cylinder rod 54a of the first cylinder 54 fitted therein and located between a lower clamp mechanism 53 and a cylinder case 54b of the first cylinder 54, and a pair of second cylinders 55 located sidewardly of the first cylinder 54 and connected to a bottom face of the cylinder case 54b via a cylinder support member 59 for moving the first cylinder 54 upwardly and downwardly and for moving the lower clamp mechanism 53 upwardly and downwardly via the stem 57 and the first cylinder 54. The center mechanism performs shaping of a green tire while the positional relationship between the upper clamp mechanism 52 and the lower clamp mechanism 53 is detected by positioners 58 provided on the first cylinder 54 in the stem 57 and one of the second cylinders 55.

However, if it is tried to provide the positioner 58 between the guide rods 56 as in the construction ① of FIG. 4 or to provide a positioner 58 in the stem 57 as in the construction ② of FIG. 5, a complicated structure or working for incorporating the positioner 58 into a limited space is required, which results in increase in cost of the center mechanism. Further, upon maintenance of the positioner 58, the guide rods 56 and the stem 57 other than the positioner 58 must be removed, which makes the working efficiency low.

Further, where the first cylinder 54 and the second cylinder 55 are arranged in series as in the construction ① of FIG. 4, since the center mechanism has a comparatively great length in the vertical direction, the tire vulcanizer in which the center mechanism is incorporated has a comparatively large size and besides a pit 60 for accommodating the second cylinder 55 must be dug deep as much, resulting in increase in cost required for a building or a foundation work.

On the other hand, where the second cylinders 55 are arranged sidewardly of the first cylinder 54 as in the construction ② of FIG. 5, the center mechanism can be formed short in the vertical direction comparing with that where the first cylinder 54 and second cylinder 55 are arranged in series. However, since the cylinder support member 59 is provided on the bottom face of the first cylinder 54 and besides the first cylinder 54 and the second cylinders 55 are arranged in parallel to each other via the cylinder support member 59, a pit 60 must be dug wide so that it may accommodate the first cylinder 54 and the second cylinders 55 therein. As a result, the cost required for a foundation work cannot be reduced sufficiently.

SUMMARY OF THE INVENTION

It is a first object of the present invention to provide a center mechanism wherein the structure and working for incorporating a positioner is simplified to reduce the cost and improve the working efficiency upon maintenance.

It is a second object of the present invention to provide a center mechanism which can be formed short in a vertical direction to allow miniaturization of a tire vulcanizer and the volume of a pit can be reduced to reduce the cost required for a foundation work.

According to the present invention, a center mechanism comprises an upper clamp mechanism for holding an upper edge portion of a bladder, a lower clamp mechanism for holding a lower edge portion of the bladder, a first cylinder for moving the upper clamp mechanism upwardly and downwardly by back and forth movement of a cylinder rod thereof and for supporting the lower clamp mechanism by means of a stem through which the cylinder rod of the first cylinder extends, a second cylinder for moving the first cylinder upwardly and downwardly, and position detection means for detecting a stroke amount of the first cylinder in order to allow the upper clamp mechanism to be moved down to a shaping height suitable for a tire size and allow the bladder to be expanded into close contact with an inner face of a green tire clamped between the upper and lower clamp mechanisms. The position detection means includes a stroke bracket having a stroke portion extending downwardly in parallel to the first cylinder from within the stem and provided so as to advance into the stem together with the cylinder rod, and detection means for detecting the stroke amount of the first cylinder from the stroke portion of the stroke bracket remaining outside the stem.

The center mechanism for a tire vulcanizer may be constructed such that the second cylinder is arranged in parallel to the first cylinder and is connected to a side face of a cylinder case of the first cylinder via a cylinder support member.

In the center mechanism for a tire vulcanizer, since the detection means detects the stroke amount of the first cylinder from the stroke portion of the stroke bracket remaining outside the stem, the detection means is arranged in a space outside the stem. Accordingly, comparing with the case wherein detection means is arranged in a limited space in a stem to detect the stroke amount as in the conventional center mechanism, the structure and the working for incorporating the detection means into the center mechanism can be simplified and the working efficiency upon maintenance can be improved.

Further, where the second cylinder is connected to the side face of the cylinder case of the first cylinder via the cylinder support member, the area of the pit can be set so as to correspond only to the first cylinder different from the conventional center mechanism wherein a cylinder support member is connected to a bottom face of a cylinder case.

PREFERRED EMBODIMENT OF THE INVENTION

Figure 1:
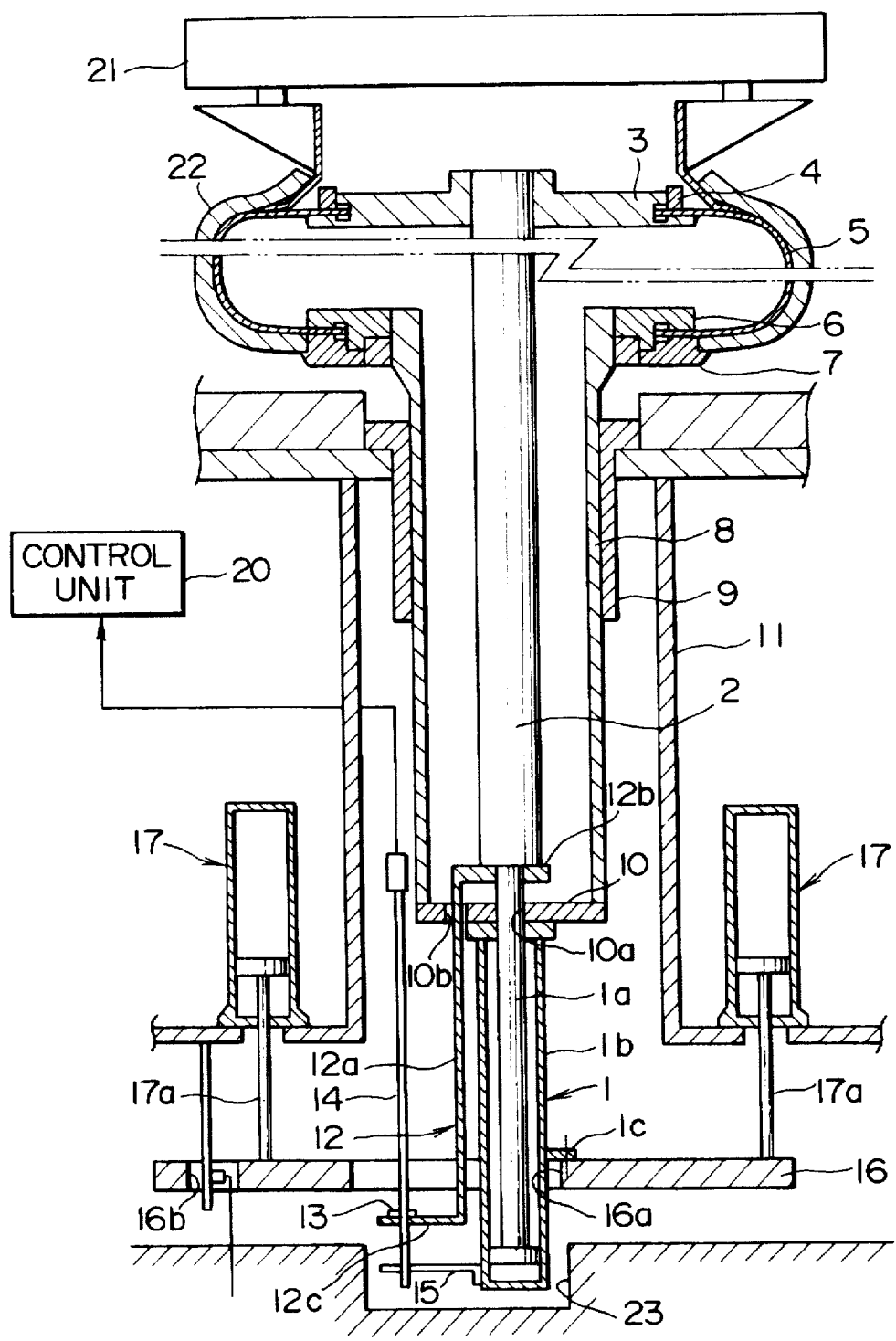
FIG. 1 is a vertical sectional view, partly omitted, showing a center mechanism according to the present invention.
Figure 2:
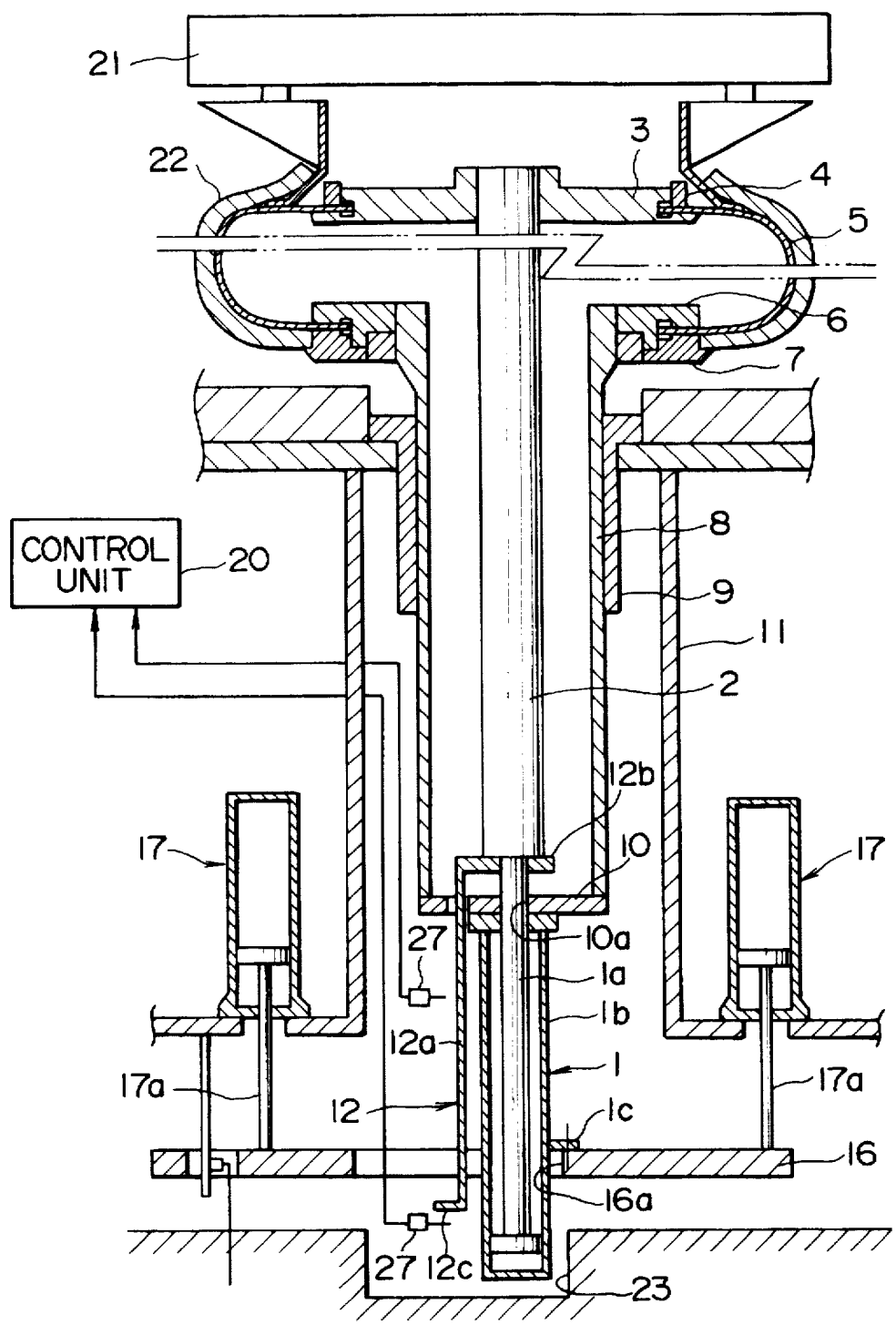
FIG. 2 is a vertical sectional view, partly omitted, showing a modified form of the center mechanism according to the present invention.
Figure 3:
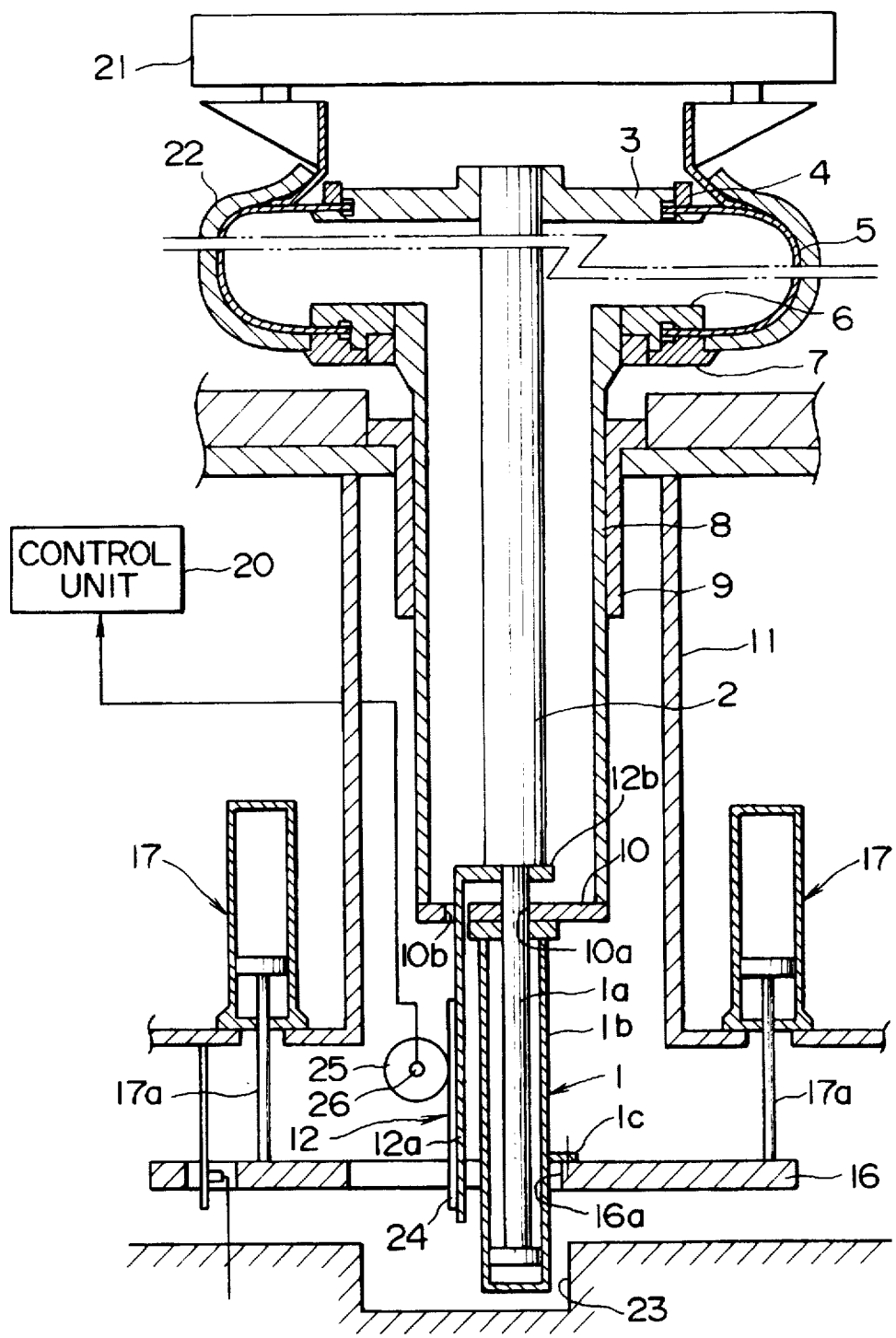
FIG. 3 is a vertical sectional view, partly omitted, showing another modified form of the center mechanism according to the present invention.
Figure 4:
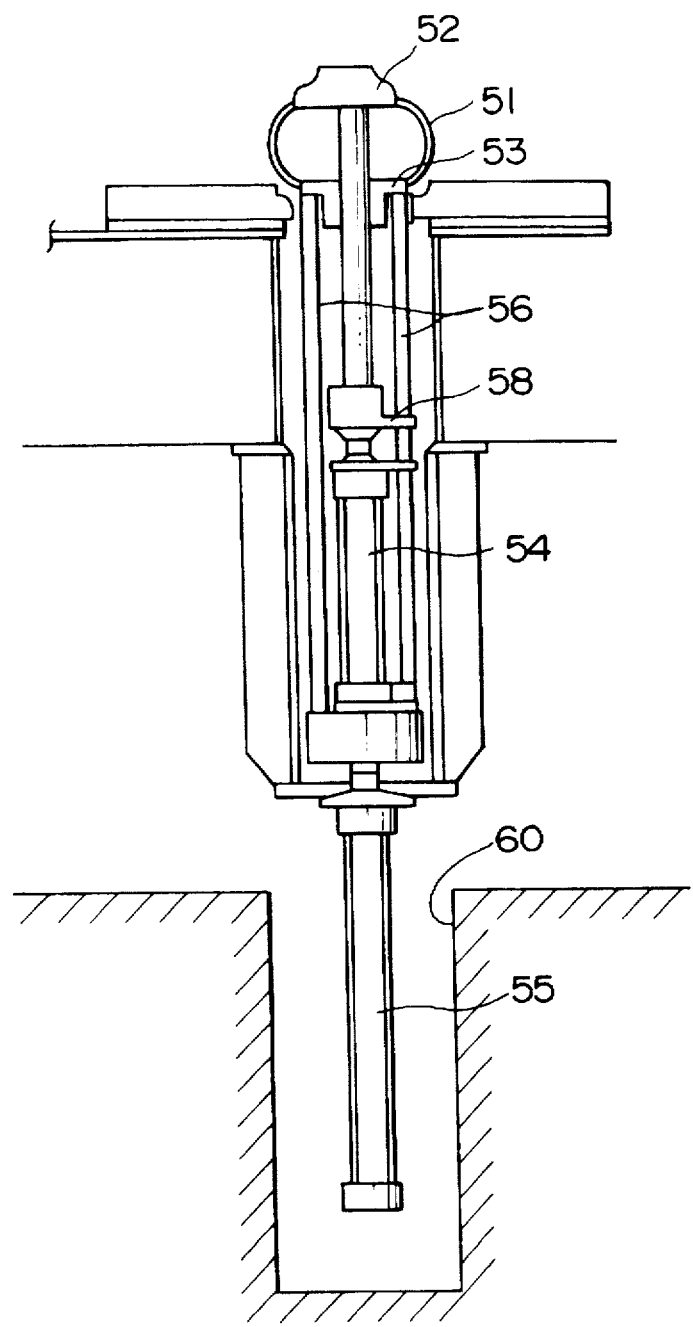
FIG. 4 is a schematic view showing a general construction of a conventional center mechanism.
Figure 5:
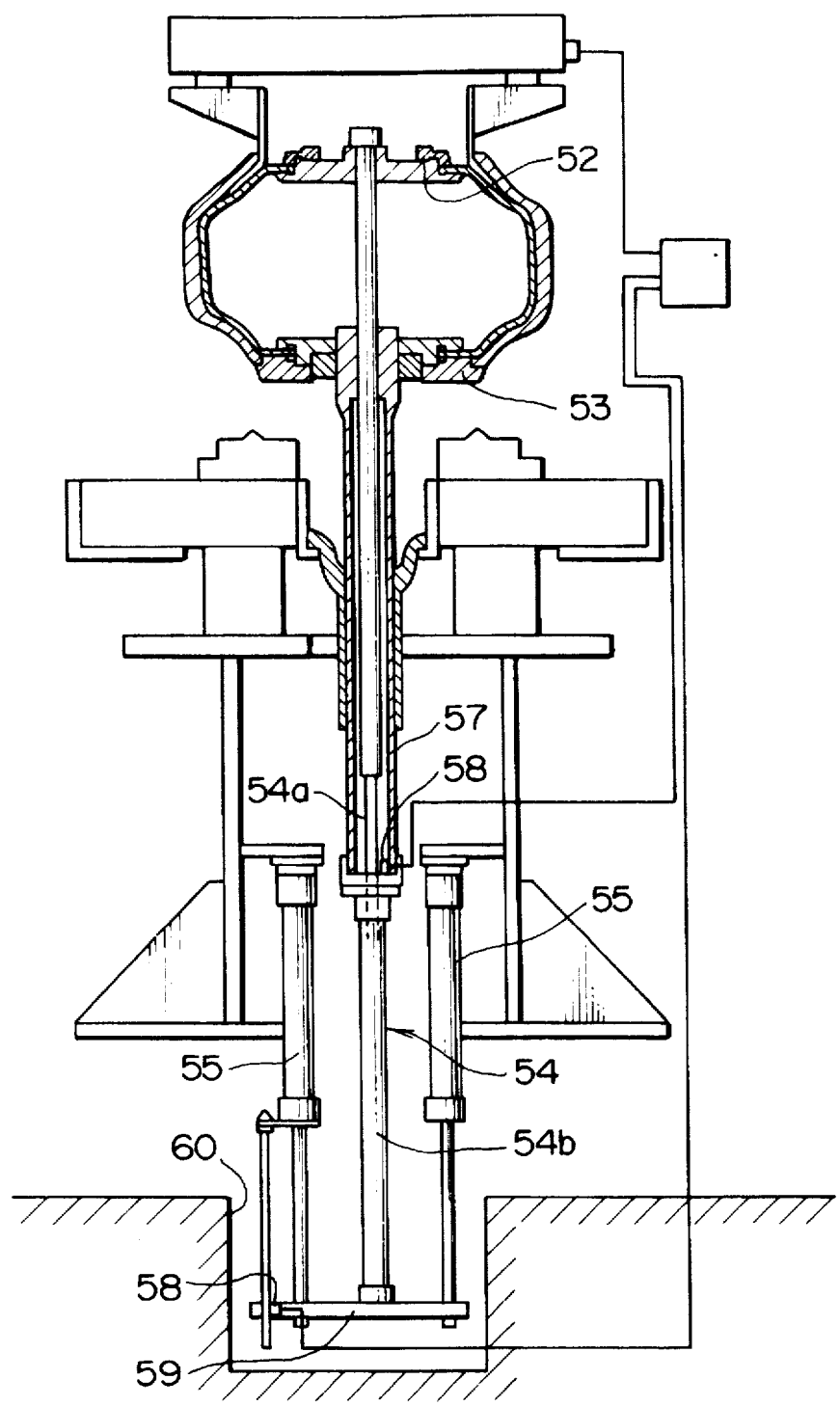
FIG. 5 is a schematic vertical sectional view of another conventional center mechanism.

An embodiment of the present invention will be described with reference to FIGS. 1 to 3.

The center mechanism for a tire vulcanizer according to the present embodiment performs shaping wherein a bladder 5 is closely contacted with an inner face of a green tire 22 transported thereto by a loader 21. The center mechanism includes an upper clamp ring 3 and an upper bead ring 4 which serve as an upper clamp mechanism for holding an upper edge of the bladder 5, and a lower clamp ring 6 and a lower bead ring 7 which serve as a lower clamp mechanism for holding a lower edge portion of the bladder 5. A center post 2 is fixed at an upper end portion thereof to a central portion of the upper clamp ring 3. The center post 2 extends downwardly in a vertical direction and has a lower end portion connected to a cylinder rod 1a of a first cylinder 1. The first cylinder 1 moves the cylinder rod 1a thereof forwardly and backwardly (upwardly and downwardly) to move the upper clamp ring 3 upwardly and downwardly via the center post 2. Further, the center post 2 prevents heat upon vulcanization shaping from being directly transmitted via the cylinder rod 1a.

Meanwhile, a stem 8 is fixed at an upper end portion thereof to the lower clamp ring 6. The stem 8 is formed in a cylindrical shape so that the center post 2 and the cylinder rod 1a described above may be fitted in the stem 8. The stem 8 is supported on a cylinder guide 9 so as to move vertically, which secured to a base frame 11. The stem 8 extends in the vertical direction.

A stem support member 10 in the form of a disk is securely mounted at a lower end portion of the stem 8 and fixed to an upper face of a cylinder case 1b of the first cylinder 1. The stem support member 10 has a rod insertion hole 10a formed in a central portion thereof, and the cylinder rod 1a of the first cylinder 1 is fitted in the rod insertion hole 10a so as to move vertically. Meanwhile, a bracket insertion hole 10b is formed in a diametrical outer portion of the stem support member 10, and a stroke portion 12a of a stroke bracket 12 (position detection means) is fitted in the bracket insertion hole 10b so as to move vertically.

The stroke portion 12a of the stroke bracket 12 has an upper end portion bent toward the cylinder rod 1a and fixed to the cylinder rod 1a. The stroke portion 12a extends downwardly in parallel to the first cylinder 1 from within the stem 8 and has a lower end portion bent outwardly away from an outer periphery of the cylinder case 1b. A magnet 13 (position detection means) which is used to detect a stroke amount of the first cylinder 1 is provided at a lower end portion 12c of the stroke portion 12a of the stroke bracket 12 so that, while the stroke portion 12a of the stroke bracket 12 is advanced into the stem 8 together with the cylinder rod 1a, the stroke amount of the first cylinder 1 can be detected by the magnet 13 of the stroke portion 12a outside the stem 8.

The magnet 13 is positioned adjacent a linear sensor 14 (position detection means, detection means) arranged in parallel to the direction of movement of the stroke bracket 12. The linear sensor 14 is provided on the cylinder case 1b of the first cylinder 1 via a sensor support member 15 in a fixed condition with respect to the first cylinder 1. Consequently, the linear sensor 14 can detect the stroke amount of the first cylinder 1 by detecting the position of the magnet 13 which is moved upwardly or downwardly together with the cylinder rod 1a. The linear sensor 14 outputs the thus detected stroke amount as a first stroke signal to a control unit 20.

In this manner, in the present embodiment, since the detection means can be arranged in a large space outside the stem, a mechanism and working for incorporating the detection means into the center mechanism can be simplified to reduce the required cost and improve the working efficiency upon maintenance comparing with the conventional center mechanisms.

Further, a projecting portion 1c is formed on a side face of the cylinder case 1b of the first cylinder 1. The projecting portion 1c is formed at such a position that, when the first cylinder 1 moves to its lowermost position, the projecting portion 1c is positioned above a pit 23. The projecting portion 1c is connected to a cylinder support member 16 for supporting the first cylinder 1. The cylinder support member 16 is formed as a flat plate in which a first through-hole 16a and a second through-hole 16b are formed in such a manner as to allow the cylinder case 1b, the linear sensor 14 and so forth to pass therethrough.

Cylinder rods 17a of a pair of second cylinders 17 arranged in parallel to the first cylinder 1 are connected to the opposite ends of the cylinder support member 16. The second cylinders 17 are secured at a pair of left and right locations to the base frame 11 with respect to the first cylinder 1 so that, when the cylinder rods 17a are advanced (moved downwardly), the first cylinder 1 is moved down via the cylinder support member 16, but when the cylinder rods 17a are retracted (moved upwardly), the first cylinder 1 is moved upwardly via the cylinder support member 16. The control unit 20 controls the first stroke signal from the linear sensor 14 so as to perform shaping.

In this manner, in the present embodiment, since the second cylinders are arranged in parallel to the first cylinder, the center mechanism can be formed shorter in the vertical direction than that where the first cylinder and the second cylinder are arranged in series. Further, since the second cylinders are connected to the side face of the cylinder case of the first cylinder via the cylinder support member, the present embodiment is advantageous in that the area of the pit can be set so as to correspond only to the first cylinder and consequently the cost required for a foundation work can be reduced comparing with the alternative construction wherein the cylinder support member is connected to the bottom face of the cylinder case as in the conventional center mechanism.

Operation of the center mechanism having the construction described above will be described.

First, in order to install the center mechanism provided in a tire vulcanizer, since the center mechanism projects downwardly from the base frame 11, the pit 23 is dug so that a lowermost portion of the center mechanism may be positioned lower than the installation plane of the tire vulcanizer. In this instance, the first cylinder 1 is supported by the cylinder support member 16 connected to the projecting portion 1c, and the cylinder support member 16 is supported from above by the second cylinders 17 arranged in parallel to the first cylinder 1. Accordingly, since only the first cylinder 1 of the center mechanism is in a downwardly projecting condition and the center mechanism is comparatively short in the vertical direction, a shallow pit of a small area corresponding to the first cylinder 1 may be dug as the pit 23.

Then, in order to perform shaping, the first cylinder 1 advances the cylinder rod 1a thereof to lift the upper clamp ring 3 via the center post 2. Consequently, the upper clamp ring 3 is lifted by the first cylinder 1 until it comes to a predetermined height position. Accordingly, the bladder 5 held by the lower clamp ring 6 and the lower bead ring 7 is extended in the upward direction so that it has a diameter smaller than the inner diameter of a green tire 22.

Then, a green tire 22 is transported by the loader 21 and moved down from above the bladder 5. When the green tire 22 moves down substantially to a position of the height of the center of the bladder 5 in the extended condition, the downward movement is stopped, and then, pressure gas such as steam is supplied into the bladder 5. Then, the first cylinder 1 retracts the cylinder rod 1a thereof to move down the upper clamp ring 3. Consequently, the bladder 5 is brought into contact with an inner face of the green tire 22 while being gradually deformed so as to be curved outwardly by the pressure of the pressure gas to perform shaping of the green tire 22.

Subsequently, when to inspect or repair the linear sensor 14 and the magnet 13 for detecting the stroke amount of the first cylinder 1, the condition of the linear sensor 14 is observed by an operator. In this instance, since the linear sensor 14 is positioned outside the first cylinder 1 and the base frame 11, the operator can sufficiently observe the linear sensor 14 even from the outside of the first cylinder 1. Accordingly, an abnormal condition such as a damage can be found out immediately. When an abnormal condition is found out, the failing linear sensor 14 or magnet 13 can be exchanged in a large space outside the first cylinder 1.

It is to be noted that, while, in the present embodiment, the stroke amount of the first cylinder 1 is detected using the linear sensor 14 and the magnet 13, the means for detecting the stroke amount is not specifically limited to this. In particular, the stroke amount may be detected, as seen from FIG. 2, by means of a pair of detection switches 27 each in the form of a limit switch or a contactless switch arranged at positions at which the lower end portion 12c of the stroke bracket 12 arrives when the stroke amount of the first cylinder 1 exhibits a maximum value and a minimum value. Or, the stroke amount may be detected by detecting, by means of a rotary encoder 26 (rotational position detector) shown in FIG. 3, an angle of rotation of a pinion 25 meshed with a rack gear 24 provided on the stroke portion 12a of the stroke bracket 12 as shown in FIG. 3. Or else, a potentiometer or a magnet scale may be employed in place of a linear sensor.

What is claimed is:

1. A center mechanism for a tire vulcanizer including a bladder, comprising:

an upper clamp mechanism for holding an upper edge portion of said bladder;

a lower clamp mechanism for holding a lower edge portion of said bladder;

a first cylinder for moving said upper clamp mechanism upwardly and downwardly by reciprocation of a cylinder rod thereof, said first cylinder extending into a pit when in a lowermost position thereof;

a stem for supporting said lower clamp mechanism, through which said cylinder rod of said first cylinder extends;

a second cylinder for moving said first cylinder upwardly and downwardly, wherein said second cylinder is arranged in parallel to said first cylinder and is connected to a side face of a cylinder case of said first cylinder via a cylinder support member, and wherein a position at which said cylinder support member is connected to said side face of said cylinder case of said first cylinder is set such that, when said first cylinder moves to its lowermost position, said cylinder support member is positioned above the pit; and position detection means for detecting a stroke amount of said first cylinder with respect to said second cylinder;

said position detection means including a stroke bracket having a stroke portion extending downwardly in parallel to said first cylinder and outwardly from within said stem and provided so as to advance into said stem together with said cylinder rod of said first cylinder, and detection means for detecting the stroke amount of said first cylinder from said stroke portion of said stroke bracket outside said stem.

2. A center mechanism for a tire vulcanizer according to claim 1, wherein said detection means is a linear sensor provided in parallel to a direction in which said stroke bracket moves.

3. A center mechanism for a tire vulcanizer according to claim 1, wherein said detection means includes a pair of detection switches located at positions at which a lower end portion of said stroke bracket arrives when the stroke amount of said first cylinder exhibits a maximum value and a minimum value.

4. A center mechanism for a tire vulcanizer according to claim 1, wherein said detection means includes:

a rack gear provided on said stroke portion of said stroke bracket;

a pinion meshed with said rack gear; and rotational position detection means for detecting an angle of rotation of said pinion.

* * * * *